(12) United States Patent
Theeuwen et al.

(10) Patent No.: US 7,913,930 B2
(45) Date of Patent: Mar. 29, 2011

(54) SPRAY BOOM WITH DAMPENING DEVICE

(75) Inventors: Hans Andre Johan Theeuwen, PT Panningen (NL); Petrus Johannes Maria Fransen, PH Nederweert (NL); Kent Alvin Klemme, Ankeny, IA (US)

(73) Assignee: John Deere Fabriek Horst B.V., Horst (NL)

( * ) Notice: Subject to any disclaimer, the term of this patent is extended or adjusted under 35 U.S.C. 154(b) by 205 days.

(21) Appl. No.: 12/323,531

(22) Filed: Nov. 26, 2008

(65) Prior Publication Data

US 2009/0173802 A1 Jul. 9, 2009

(30) Foreign Application Priority Data

Nov. 28, 2007 (DE) .................. 10 2007 047 886

(51) Int. Cl.
*B05B 1/20* (2006.01)
*B66C 13/06* (2006.01)
(52) U.S. Cl. ......... 239/164; 239/159; 239/172; 212/273
(58) Field of Classification Search .......... 239/159–164, 239/166–169, 172, 175; 212/272, 273, 284, 212/287–289, 347
See application file for complete search history.

(56) References Cited

U.S. PATENT DOCUMENTS

| | | | | |
|---|---|---|---|---|
| 4,288,034 A | * | 9/1981 | Widmer et al. | 239/168 |
| 5,222,614 A | * | 6/1993 | Ballu | 212/347 |
| 6,053,419 A | * | 4/2000 | Krohn et al. | 239/1 |
| 6,834,223 B2 | * | 12/2004 | Strelioff et al. | 701/50 |
| 7,152,811 B2 | * | 12/2006 | Gunlogson et al. | 239/159 |

FOREIGN PATENT DOCUMENTS

| | | |
|---|---|---|
| DE | 692 00 067 | 10/1994 |
| DE | 200 18 716 | 5/2001 |
| DE | 100 54 285 | 5/2002 |
| EP | 0494125 A1 | 7/1992 |
| EP | 1 716 754 | 3/2006 |
| EP | 1 444 894 | 1/2007 |
| FR | 2 813 212 | 3/2002 |

OTHER PUBLICATIONS

European Search Report (4 pages).

* cited by examiner

*Primary Examiner* — Darren W Gorman

(57) ABSTRACT

A spray linkage (10) for a crop sprayer includes a support (16) and a central frame (18) pivotally connected to the support (16), the central frame (18) being pivotable about an axis (32) from a neutral position. At least one hydraulic cylinder (34, 36) is fastened at one end to the support (16) and at the other end to the central frame (18). To damp the spray linkage (10) during oscillating movements, at least a first hydraulic cylinder (34, 36) has a first and a second hydraulic chamber (44, 46, 48, 50), a first hydraulic line (52, 54) is provided which discharges into the first hydraulic chamber (44, 46) and a second hydraulic line (54, 52) is provided which discharges into the second hydraulic chamber (48, 50). Restrictor structure (58, 60, 62, 64) throttles hydraulic flow from a hydraulic chamber (44, 46, 48, 50) while hydraulic flow into a hydraulic chamber (44, 46, 48, 50) is relatively unthrottled.

19 Claims, 4 Drawing Sheets

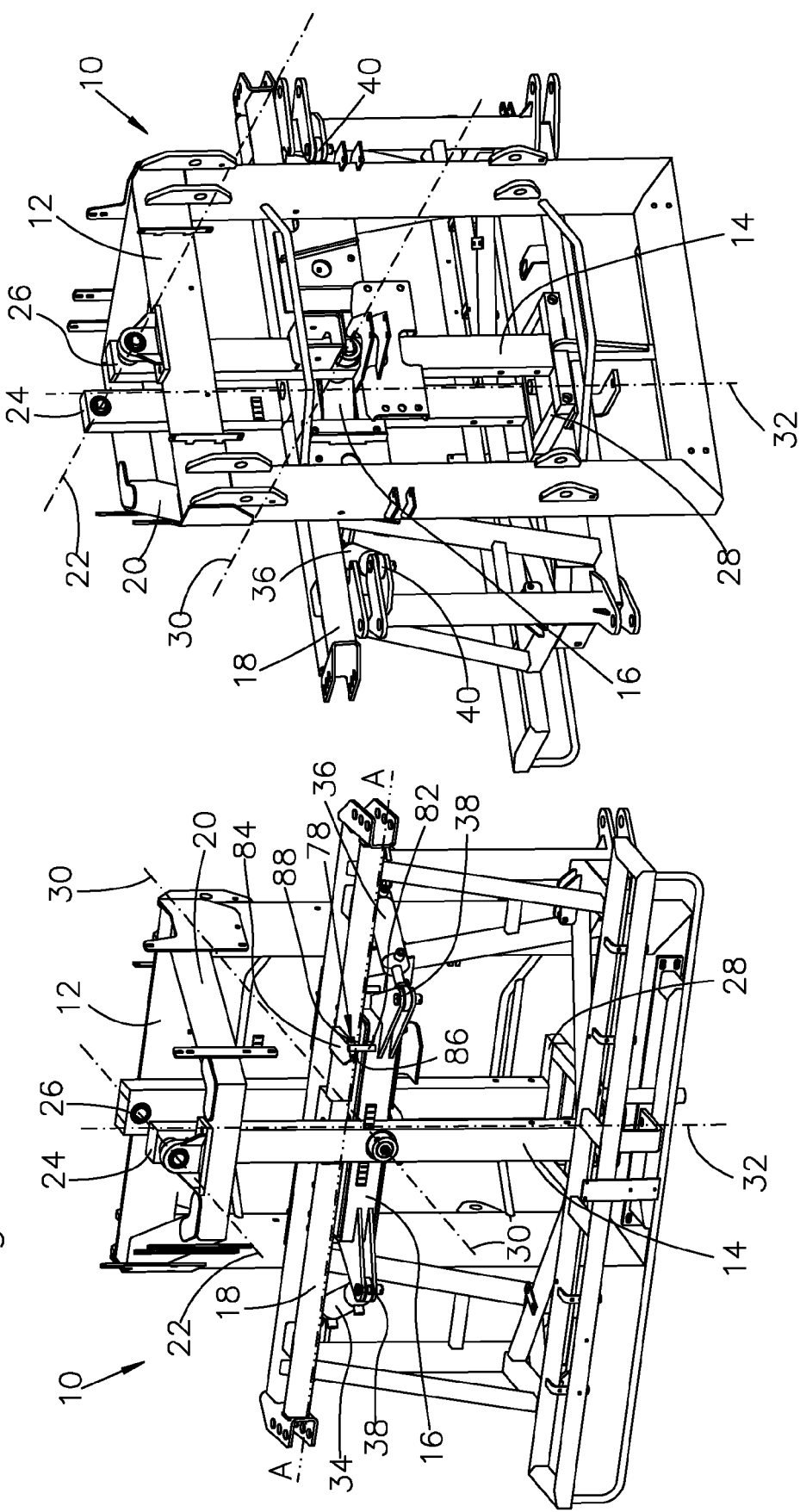

SPRAY BOOM WITH DAMPENING DEVICE

This application claims priority based on German Application No. 10 2007 047 886.2, filed on Nov. 28, 2007, which is hereby incorporated by reference into this application.

FIELD OF THE INVENTION

The invention relates to a spray linkage for a crop sprayer, comprising a support and a central frame fastened pivotally to the support, the central frame being pivotable on both sides relative to the support from a neutral position about a substantially upright oscillating axis, and at least one first hydraulic cylinder connected at one end to the support and at the other end to the central frame, such that when pivoting the central frame relative to the support from the neutral position the at least first hydraulic cylinder is extended or retracted.

BACKGROUND OF THE INVENTION

Spraying devices such as crop sprayers are used in agriculture. Crop sprayers may be configured as self-propelled spraying machines or as spraying machines attached to or mounted on a tractor or other vehicle. The crop sprayers have linkage attached spraying or spreading devices for applying and/or distributing fertilizer, plant protection agents and/or pesticides and the like on a field to be worked. Such spray linkages are subjected to loads, in addition to their own weight, such as centrifugal forces during sprayer cornering. The forces act dynamically both on the vehicle and on the linkage itself. In order to counteract or compensate for the loads, the central frame of a spray linkage is suspended in an oscillating manner relative to the support of the central frame for movement about an upright oscillating axis. The suspension absorbs and/or to compensates for the oscillating movements via spring damper systems connected between the support and central frame. Embodiments with spring damper systems are complicated and expensive, and spring and damping characteristic can only be varied in a limited manner.

EP 1 716 754 A2 discloses an agricultural crop sprayer comprising a spray linkage suspended for oscillation about a vertical axis. The spray linkage is equipped with a motorized actuating member to align the spray linkage at right angles to a desired direction of the path of the vehicle depending on a sensor signal. In this example, a hydraulic cylinder is used as a motorized actuating member. Such a spray linkage is, however, not designed to counteract dynamic loads and/or to reduce and/or to compensate for centrifugal forces effects.

SUMMARY OF THE INVENTION

The object of the invention is to provide a spray linkage of the aforementioned type which overcomes one or more of the aforementioned problems.

The object is achieved according to the invention by the teaching of claim 1. Further advantageous embodiments and developments of the invention emerge from the claims dependent therefrom.

According to the invention, a spray linkage of the aforementioned type includes a first hydraulic cylinder having a first and a second hydraulic chamber, and a first hydraulic line discharges into the first hydraulic chamber of the at least first hydraulic cylinder. A second hydraulic line discharges into the second hydraulic chamber of the at least the first hydraulic cylinder. Hydraulic flow from a hydraulic chamber is throttled, and a hydraulic flow into a hydraulic chamber in a substantially unthrottled. The hydraulic lines are arranged so that in the at least the first hydraulic cylinder a hydraulic flow out of the one hydraulic chamber is linked to a hydraulic flow into the other hydraulic chamber. The first hydraulic cylinder is arranged on one side of the upright oscillating axis and pivotally connected to the central frame and to the support to define a mechanical coupling. During pivoting and/or oscillating movements of the spray linkage about the upright oscillating axis at least one hydraulic cylinder is retracted or extended. Throttling structure for throttling the hydraulic fluid flowing out of a chamber which is reducing in size produces damping of and/or resistance to movement. Fluid flowing into the enlarging chamber is relatively unthrottled manner and restores the hydraulic balance. The resulting system operates without need for conventional spring damper systems. The damping and compensation of oscillating movements of the spray linkage is achieved by a structurally simple arrangement of at least one hydraulic cylinder in combination with means for throttling the hydraulic fluid. The spray linkage is suitable for a crop sprayer and, in an operating position, extends substantially transversely to a direction of travel of tractor or carrier vehicle. The direction of vehicle travel corresponds to the direction of discharge of sprayed product on a field to be worked. Deviations of the spray linkage from the aforementioned transverse direction occur when, for example, accelerating forces act on the spray linkage. In the normal operating position, the spray linkage extends substantially horizontally over the surface of the field with deviations caused by oscillating movements, for example, from the effect of centrifugal forces during cornering.

Preferably first and second hydraulic cylinders are arranged on opposite sides of the upright oscillating axis. When pivoting the central frame relative to the support from the neutral position, the first hydraulic cylinder is extended or retracted and the second hydraulic cylinder is synchronously retracted or extended. The first hydraulic line connects the first hydraulic chamber of the first hydraulic cylinder to the second hydraulic chamber of the second hydraulic cylinder, and the second hydraulic line connects the second hydraulic chamber of the first hydraulic cylinder to the first hydraulic chamber of the second hydraulic cylinder. Both of the hydraulic cylinders are fastened in an articulated manner to the central frame and to the support respectively. As a result, a mechanical coupling is defined such that during pivoting and/or oscillating movements of the spray linkage about the upright oscillating axis, one of the hydraulic cylinders is retracted and the other hydraulic cylinder is synchronously extended. Thus an outflow of hydraulic fluid from the one chamber of the first hydraulic cylinder is automatically linked to an outflow of hydraulic fluid from the opposing chamber of the second hydraulic cylinder. At the same time, fluid flows into the respective other chambers of one of each hydraulic cylinder. Throttling means throttles the hydraulic fluid flowing out of the chambers to provide movement damping and/or resistance to movement, wherein the chambers which enlarge are filled in an unthrottled manner with hydraulic fluid for restoring the hydraulic balance.

Preferably, a one-way restrictor opens in the direction of the hydraulic chamber to throttle hydraulic flow out of a chamber while hydraulic flow into a chamber is unthrottled. The first and second hydraulic lines are provided one-way restrictors connected to the chambers. The one-way restrictors may be configured as a hydraulic module. It is also possible to achieve a design with the same effect by a hydraulic throttle or aperture combined with a bypass line provided with a non-return valve, the non-return valve being arranged opening toward the corresponding chamber. It is further possible to configure the one-way restrictor and/or the throttle to be able to be varied and/or controlled in its cross section, so that variable throttle rates may be set.

In a preferred embodiment of the invention, a hydraulic tank is provided and both hydraulic lines are connected to the hydraulic tank and/or connected to one another and together connected to the hydraulic tank. As a result, it is possible that with differently configured chambers during hydraulic flow out of a chamber and/or into a chamber, excess hydraulic fluid may be discharged to the hydraulic tank and/or insufficient hydraulic fluid may be drawn from the hydraulic tank.

In a further preferred embodiment of the invention, an on-off valve is provided which connects the first and/or the second hydraulic line to the hydraulic tank, the on-off valve preferably being configured as a 4/3-way valve with a floating central position and the on-off valve preferably being actuatable depending on a pivoted position of the central frame relative to the support. Naturally, in place of a 4/3-way valve a further similar-acting on-off valve or a corresponding on-off valve combination may also be arranged. In a first position the on-off valve connects the two hydraulic lines to one another and to the hydraulic tank. In the two remaining positions, one respective hydraulic line may be connected to the hydraulic tank and the corresponding other hydraulic line may be connected, for example, to a hydraulic source in the form of a hydraulic pump or a hydraulic accumulator.

Preferably a hydraulic accumulator is provided which may be connected via the on-off valve to the first or to the second hydraulic line. The hydraulic accumulator is preferably loaded to a preadjusted hydraulic pressure and, when connected, may operate as a hydraulic spring.

Preferably, in a further preferred embodiment of the invention, a sensor is provided which signals at least one pivoted position of the central frame in relation to the support and/or relative to the support. Thus for example, when reaching a predeterminable pivoting angle and/or angle of oscillation a signal may be generated, as a result of which a measure for altering the hydraulic pressure or the throttle rate may be initiated. Thus depending on the sensor signal, the actuation of an on-off valve connected to the hydraulic lines may be undertaken and/or controlled. The sensor may, for example, be configured as a switch or rotational angle sensor, and the switch and/or rotational angle sensor triggers a sensor signal at one or more predeterminable pivoting angles of the central frame relative to the support. The sensor also may be configured as an electromagnetic sensor which triggers a sensor signal when reaching one or more predeterminable positions of the central frame. The sensor signal may, for example, be directly forwarded to an on-off valve or, for example, an electronic control unit may also be provided which, depending on the sensor signal, generates a corresponding control signal for an on-off valve. In combination with the sensor and/or with a sensor signal or control signal generated by the sensor, the hydraulic accumulator may also be connected thereto or separated therefrom. Thus, for example, when the angle exceeds or falls below a predeterminable pivoting angle and/or oscillation angle, the on-off valve is actuated such that a connection to the hydraulic accumulator is created or interrupted.

Preferably a pressure control valve is provided which is arranged between the hydraulic accumulator and the on-off valve. Preferably, the pressure control valve opens in the direction of the hydraulic cylinders and closes when an excessive system pressure is set, i.e. a system pressure which exceeds a limit pressure preset on the pressure control valve. The pressure control valve makes it possible to supply hydraulic fluid provided by the hydraulic accumulator at a preadjusted pressure value into the system, so that a uniform pressure is set relative to the hydraulic fluid flowing from the hydraulic accumulator to the hydraulic cylinders. For example, after the central frame has moved from a neutral central position, the central frame is moved back into the neutral central position by a uniform additional restoring force.

Preferably, a first pressure relief valve or sequence valve located between the hydraulic accumulator and the on-off valve is connected in parallel with the pressure control valve. The pressure relief valve makes it possible that, for example, at relatively high system pressures, for example when the central frame is moved from a neutral position by an impact at high pivoting speed, hydraulic fluid is able to be fed into the hydraulic accumulator. This may take place when a limit pressure, preset on the pressure relief valve, is exceeded so that the pressure relief valve opens in the direction of the hydraulic accumulator. Preferably, the limit pressure set on the pressure relief valve is above the limit pressure set on the pressure control valve, so that when the system pressure drops, the pressure control valve only opens after the pressure relief valve has been closed.

A further pressure relief valve or sequence valve may be provided in order to safeguard hydraulically the spray linkage and/or the entire hydraulic system. If a maximum pressure were to be exceeded, the pressure relief valve would open in the direction of a hydraulic tank. Preferably, the pressure relief valve is arranged between the hydraulic accumulator and the hydraulic tank.

In a preferred embodiment of the invention, on both sides of the upright oscillating axis, one respective resilient stop is arranged, preferably in the form of an elastomeric body or buffer and/or rubber buffer. The buffer is mounted so that when pivoting the central frame relative to the support, the buffer acts as a stop, the elastomeric body or buffer being compressed when the central frame is struck and a force compensating for the pivoting energy and/or acting counter to the pivoting motion of the central frame being created, which is preferably greater the more the body and/or buffer is compressed. This force is then released as a restoring force, by the body and/or buffer being accordingly decompressed. Instead of the elastomeric bodies or buffers, resilient spring elements which are compressed when the central frame is struck are used to create a spring restoring force. Other bodies in the form of resilient stops may be also used to this end.

Preferably, an oscillating frame pivotally suspends the support on the oscillating frame about a lower oscillating axis aligned horizontally in the direction of travel. The oscillating frame is used to pivotally suspend the spray linkage about a horizontal axis to counteract oscillating movements of the spray linkage. Such movements occur, in particular, when the spraying vehicle is moved over uneven ground. The vertical pivoting and/or oscillating movements of the spray linkage have a negative effect on the spraying performance.

In order to improve further the pivoting behavior of the spray linkage, the oscillating frame may also be pivotally suspended, preferably on a mounting frame on the vehicle, for pivoting about an upper oscillating axis, the axis being generally horizontally aligned in the direction of travel. As a result, two oscillating axes are obtained to which it is possible to react independently of one another. Thus vertical oscillating movements of the spray linkage about the additional oscillating axis may be counteracted by pivoting the spray linkage in an opposing manner about the one oscillating axis or vice versa.

In a preferred embodiment of the invention, the mounting frame is connected to a crop sprayer. The spraying device may be pulled by a tractor or mounted on or hitched to a vehicle. The crop sprayer and/or the spraying device may be configured as a self-propelled vehicle and/or self-propelled sprayer, on which a corresponding mounting frame provided with a spray linkage is mounted.

The mounting frame is preferably connected in a height-adjustable manner to a crop sprayer via a parallel linkage system. The height adjustment of the spray linkage is useful, firstly, to achieve with uneven ground a uniform discharge height of the sprayed product, and secondly to be able to optimally adjust the spray height to different plant heights. To this end, the parallelogram linkage system is preferably accordingly configured to be sensor controlled.

With reference to the drawings, which show an embodiment of the invention, the invention as well as further advantages and advantageous developments and embodiments of the invention are described in more detail and explained hereinafter.

BRIEF DESCRIPTION OF THE DRAWINGS

FIG. 1 is a rear schematic perspective view of a portion of a spray linkage according to the invention from behind.

FIG. 2 is a front schematic perspective view of the of the portion of the spray linkage of FIG. 1.

DESCRIPTION OF THE PREFERRED EMBODIMENT

Figure 3:
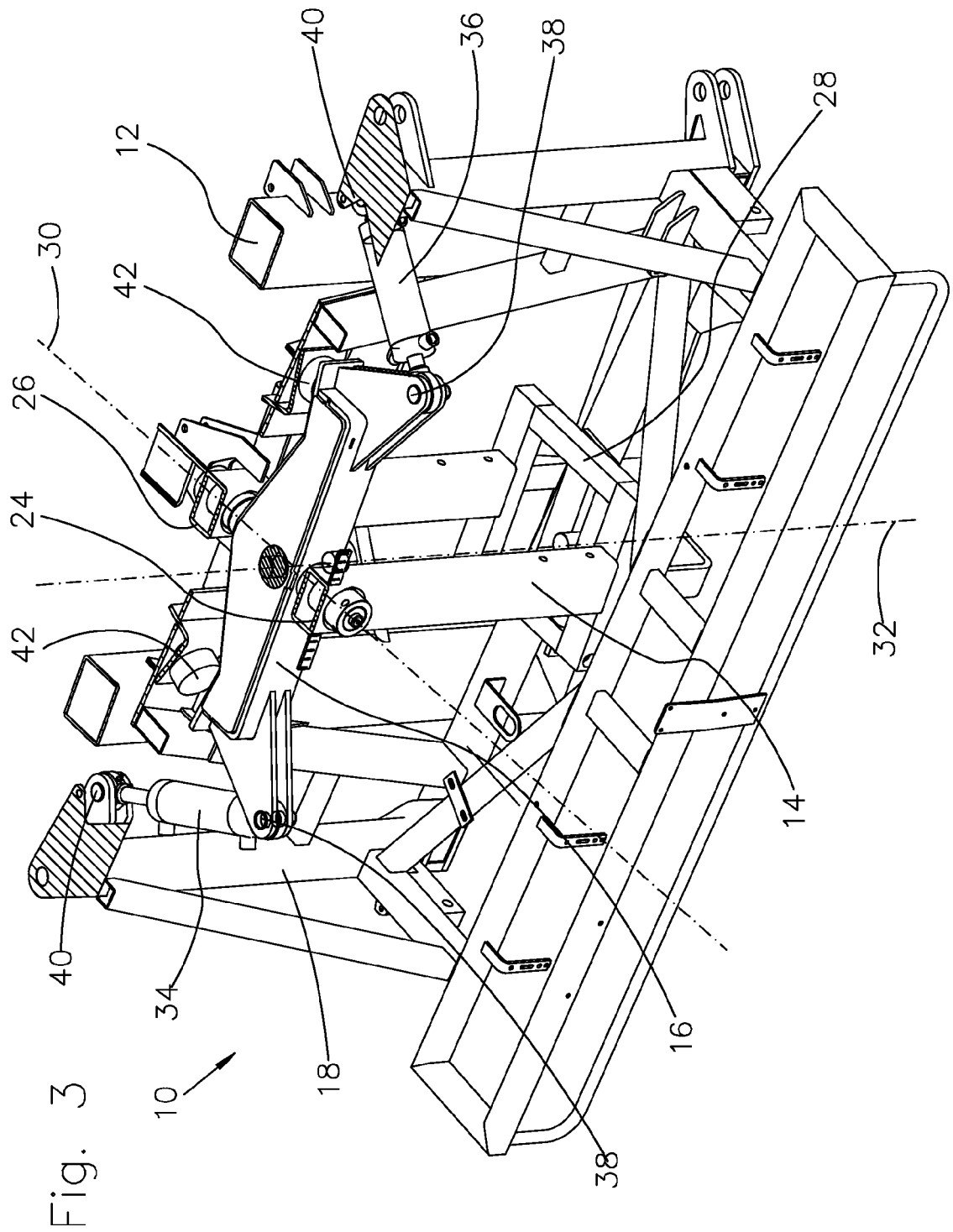
FIG. 3 is a schematic partial cross-sectional view of the portion of the spray linkage according to the invention taken generally along the line A-A of FIG. 1.

In FIGS. 1 to 3 a partial region of a spray linkage 10 for a crop sprayer (not shown) is shown. The spray linkage 10 includes a mounting frame 12, an oscillating frame 14, a support 16 and a central frame 18.

The mounting frame 12 can be mounted on a frame or a chassis (not shown) of the crop sprayer configured as a mounted crop sprayer (mounted as an attachment on the three point hitch of a tractor), as a towed crop sprayer (as a towed attachment hitched to the tow hitch of a tractor) or as a self-propelled crop sprayer (spraying device fixedly mounted on a self-propelled carrier vehicle). The mounting frame 12 preferably serves as a support frame for the entire spray linkage. On the upper face of the mounting frame 12 a mounting 20 supports an upper oscillating axis 22 aligned substantially horizontally in the direction of travel.

The oscillating frame 14 comprises two upright supports 24, 26 which are respectively mounted at their upper end in a pivotable and/or oscillating manner on the upper oscillating axis 22. On the lower face of the support a reinforcement frame 28 connects the two supports 24, 26 rigidly to one another. On the oscillating frame 14 on the supports 24, 26 in a central region of the supports 24, 26, a lower oscillating axis 30 is aligned substantially horizontally in the direction of travel and is arranged substantially centrally to the vehicle (not shown) and/or along a central longitudinal axis of the crop sprayer.

The support 16 is pivotally mounted on the lower oscillating axis 30 and extends substantially transversely to the direction of travel and horizontally aligned, and the lower oscillating axis 30 extending centrally to the support. The support 16 carries an upright oscillating axis 32 extending substantially vertically at a central location relative to the support 16. Thus all oscillating axes 22, 30, 32 are arranged centrally to the vehicle.

The central frame 18, pivotally connected to the support 16 about the vertical oscillating axis 32 extends, as does the support 16, substantially horizontally and transversely to the direction of travel. The central frame 18 represents the central part of a linkage frame of the spray linkage, only partially shown. The complete linkage frame, in addition to the central frame 18 shown here, comprising one or more left-hand and right-hand side frames (not shown) extending in the operating position transversely to the vehicle. The side frames are in this case generally pivotally fastened to the central frame 18 in a horizontal or vertical manner, the side frames being foldable toward the vehicle, and generally completely or partially unfoldable to positions transverse to the direction of travel only during the spraying operation.

According to the above embodiment, the central frame 18 is thus pivotable horizontally via the support 16 about a upright oscillating axis 32 and is suspended via the support 16 and the oscillating frame 14 about two horizontally aligned oscillating axes 22, 30 in the vertical direction. Such a dual suspension about the two horizontally aligned oscillating axes 22, 30 has the effect that vertical oscillating movements of the spray linkage 10 and/or of the central frame 18 which, for example, are caused by unevenness of the ground, may be optimally compensated and/or reduced. A resulting oscillating movement of the spray linkage in the vertical direction being made up of an oscillating movement of the oscillating frame 14 about the upper oscillating axis 20 and an oscillating movement of the support 16 about the lower oscillating axis 30. The oscillating frame 14 and the central frame 18 and/or the support 16 are in this case articulated and/or controlled such that an oscillating movement about the lower oscillating axis 30 is oriented counter to an oscillating movement about the upper oscillating axis 22, so that a resulting oscillating movement of the spray linkage 10 is markedly smaller than an oscillating movement about the upper oscillating axis 22. For controlling and/or restricting and/or steering pivoting movements and/or oscillating movements about the horizontally aligned oscillating axes 22, 30, hydraulic dampers or cylinders or even mechanical springs may be provided which in this case, however, are not described further.

The central frame 18 is connected in an articulated manner via two hydraulic cylinders 34, 36 to the support 16, the hydraulic cylinders 34, 36 in the embodiment shown in FIGS. 1 to 3 being connected by corresponding pivot bearing connections 38, 40 on the piston head side to the support 16 and on the piston rod side to the central frame 18 (visible most clearly in FIG. 3). The two hydraulic cylinders 34, 36 are preferably arranged to the right and left of the vertical oscillating axis 32, symmetrically to said oscillating axis, so that an oscillating movement of the central frame 18 relative to the support 16 on the one side of the oscillating axis 32 causes a retraction of the one hydraulic cylinder 34, 36 and on the corresponding other side of the oscillating axis 32 directly causes an extension of the other hydraulic cylinder 34, 36. In order to limit and/or absorb or stop the oscillating movement, to the right and left of the oscillating axis 32, level with the support 16, resilient stops 42 in the form of rubber buffers are arranged on the central frame 18 (see FIG. 3). The resilient stops 42 absorb an oscillating movement in a resilient manner, i.e. they act firstly as a stop and secondly absorb motion energy, by being compressed by the central frame 18 striking against the support 16. The portion of energy absorbed by compression of the resilient material of the stops 42 is again discharged in the form of motion energy to the central frame 18, by decompression of the resilient material of the stops 42, which then pivots back in the opposing direction.

Figure 4:
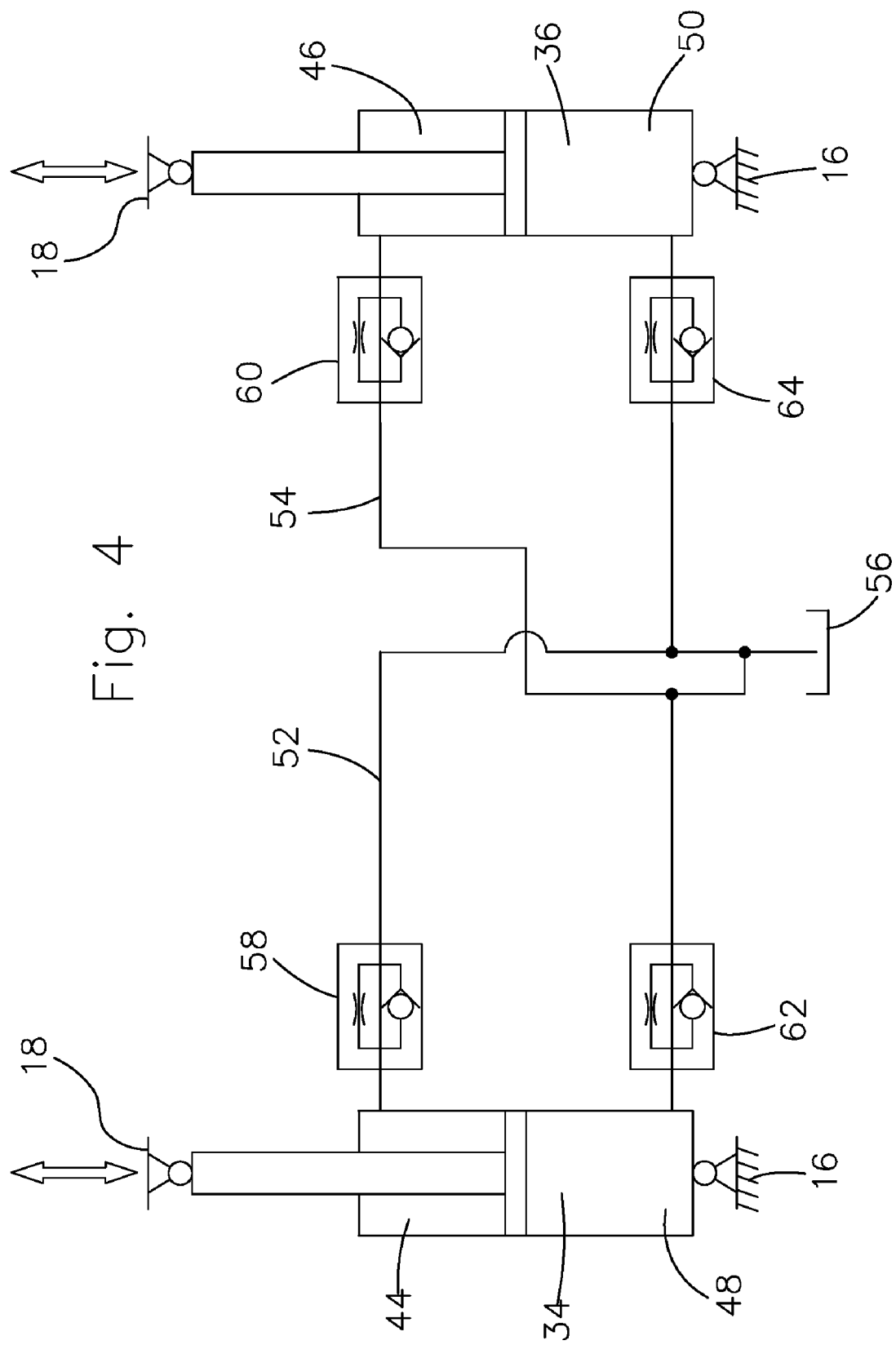
FIG. 4 is a schematic circuit diagram of a first embodiment for a hydraulic arrangement for damping a spray linkage according to the invention.
Figure 5:
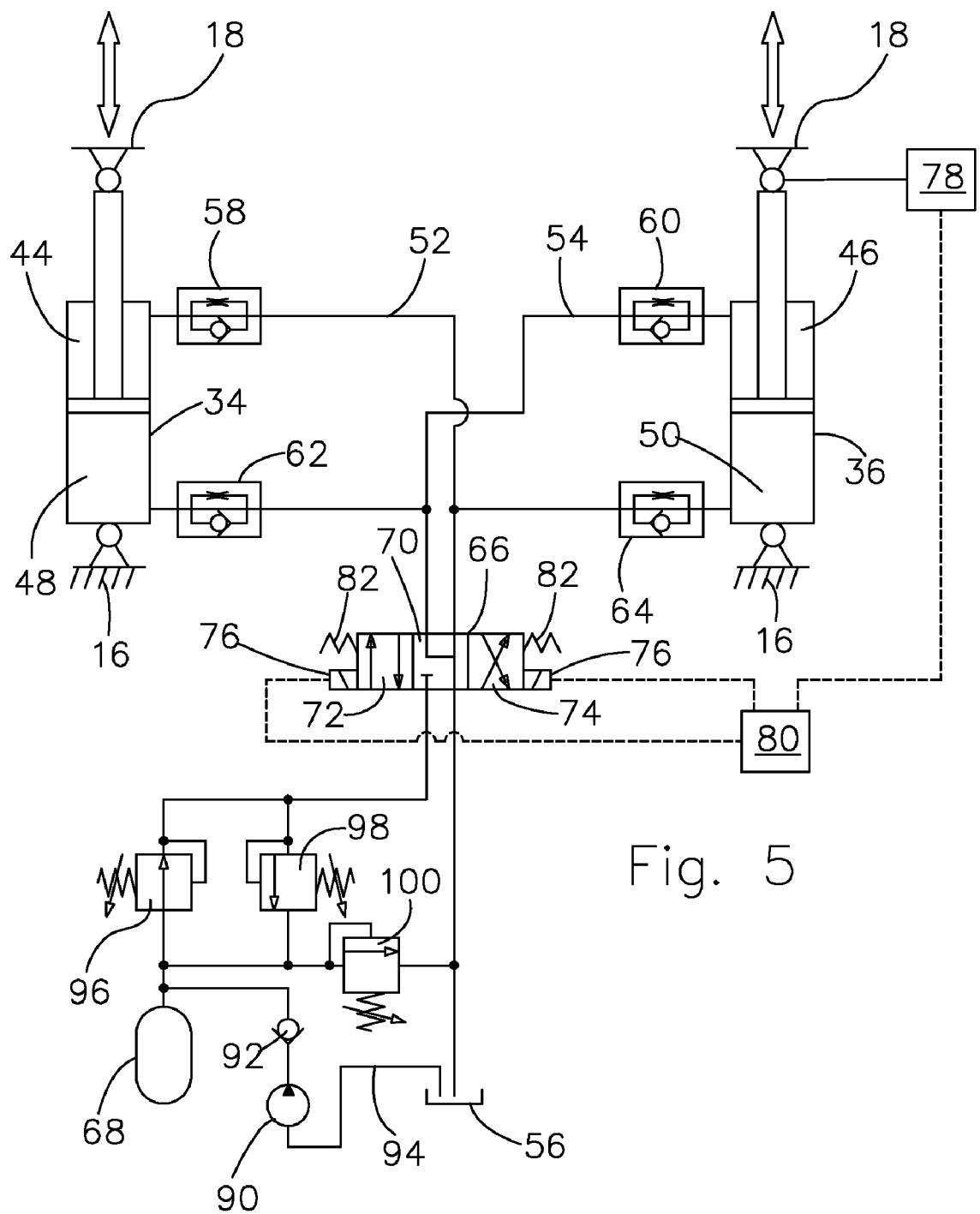
FIG. 5 a schematic circuit diagram of a second embodiment for a hydraulic arrangement for damping a spray linkage according to the invention.

The hydraulic cylinders 34, 36 are configured to be dual-acting and respectively comprise a first hydraulic chamber 44, 46 (respectively the chambers on the piston rod side in FIGS. 4 and 5) and a second hydraulic chamber 48, 50 (respectively the chambers on the piston head side in FIGS. 4 and 5). A hydraulic arrangement in a first embodiment according to the invention is shown in FIG. 4. It is indicated schematically how the hydraulic cylinders 34, 36 are arranged relative to the central frame 18 and the support 16. A neutral central position is illustrated, i.e. there is no oscillating movement and the central frame 18 is aligned parallel to the support 16, the hydraulic cylinders 34, 36 respectively having the same piston position. The hydraulic cylinders 34, 36 are connected hydraulically to one another in a cross connection via a first and a second hydraulic line 52, 54, the first hydraulic line 52 connecting the first hydraulic chamber 44 of the one hydraulic cylinder 34 (to the left in FIGS. 4 and 5) to the second hydraulic chamber 50 of the other hydraulic cylinder 36 (to the right in FIGS. 4 and 5). The second hydraulic line 54 accordingly connects the first hydraulic chamber 46 of the other hydraulic cylinder 36 (to the right in FIGS. 4 and 5) to the second hydraulic chamber 48 of the one hydraulic cylinder 34 (to the left in FIGS. 4 and 5). Moreover, a hydraulic tank 56 is provided to which the two hydraulic lines 52, 54 are connected. A one-way restrictor 58, 60, 62, 64 is associated with each of the hydraulic chambers 44, 46, 48, 50, the respective one-way restrictor 58, 60, 62, 64 being positioned in the corresponding hydraulic line 52, 54 between the hydraulic tank 56 and the corresponding hydraulic chamber 44, 46, 48, 50. The one-way restrictors 58, 60, 62, 64 used here represent a combination of a throttle and/or a throttle valve and a bypass line provided with a non-return valve, the throttle and/or the throttle valve being able to be configured to be adjustable and/or variable (not shown), i.e. the cross section of the throttle and/or the throttle valve may be able to be configured to be variable. In this connection it may be expedient to design the throttle and/or the throttle valve such that an adjustment of the cross section of the throttle and/or the throttle valve takes place via an electronic or manual device. The one-way restrictor 58, 60, 62, 64 is arranged such that hydraulic fluid issuing from one of the hydraulic chambers 44, 46, 48, 50 is throttled by the throttle, however a hydraulic flow entering one of the hydraulic chambers 44, 46, 48, 50 may take place unhindered via the corresponding non-return valve of the one-way restrictor 58, 60, 62, 64. By the throttles contained in the one-way restrictors 58, 60, 62, 64 a damping is achieved for the oscillating movement and/or pivoting movement of the central frame 18 relative to the support 16. The mechanical-hydraulic relations of the hydraulic arrangement shown in FIG. 4 are explained hereinafter with reference to an oscillating movement which causes a retraction of the left hydraulic cylinder 34 of FIG. 4: during the aforementioned oscillating and/or pivoting movement of the central frame 18 due to the synchronous mechanical coupling of the hydraulic cylinders 34, 36 to the central frame 18 and/or to the support 16, the hydraulic cylinders 34 are actuated such that the one hydraulic cylinder 34 is retracted and accordingly the other hydraulic cylinder 36 is extended. Associated therewith is that hydraulic fluid flows out of the second hydraulic chamber 48 of the one hydraulic cylinder 34 and the hydraulic fluid is throttled by the one-way restrictor 62. As a result, in turn a damping force opposes the pivoting movement of the central frame 18, which is all the greater the more rapid the pivoting movement and the smaller the cross section of the throttle and/or of the throttle valve. The cross section of the throttle is in this case preset before startup of the spray linkage 10, preferably the same for each one-way restrictor 58, 60, 62, 64 and is constant in normal use. Due to the synchronous mechanical coupling of the hydraulic cylinders 34, 36, the other hydraulic cylinder 36 is extended, whereby hydraulic fluid flows out of the first hydraulic chamber 46 of the other hydraulic cylinder 36 and the hydraulic flow is throttled by the one-way restrictor 60. As a result, also in this case the pivoting movement of the central frame 18 counters a damping force which is all the greater the more rapid the pivoting movement and the smaller the cross section of the throttle and/or of the throttle valve. The hydraulic fluid flowing out of the hydraulic chambers 48, 46 flows as a result of movement into the hydraulic chambers 44, 50 which enlarge and/or initially flows into the hydraulic tank 56 and is suctioned out therefrom into the hydraulic chambers 44, 50, in this case the hydraulic fluid not being throttled. The return of the central frame 18 relative to the support 16 takes place preferably by means of the resilient stops 42, return springs also being able to be used (not shown here) for smaller pivoting movements, in which the resilience of the stops is not utilized. As a result, it is thus achieved that an oscillating movement and/or a pivoting movement of the central frame 18 about the upright oscillating axis 32 is damped by the one-way restrictors 62, 60. The same occurs with an oscillating movement and/or pivoting movement in the opposing direction, in this case the one hydraulic cylinder 34 being retracted and the other hydraulic cylinder 36 being extended. Accordingly, a hydraulic flow then takes place out of the first hydraulic chamber 44 of the one hydraulic cylinder 34 and out of the second hydraulic chamber 50 of the other hydraulic cylinder 36 into the second hydraulic chamber 48 of the one hydraulic cylinder 34 and the first hydraulic chamber 46 of the other hydraulic cylinder 36, the throttles and/or throttle valves of the one-way restrictors 58, 64 thus producing a damping function.

FIG. 5 shows an alternative and/or extended form of an embodiment according to the invention. Additionally to the embodiment in FIG. 4, the hydraulic arrangement further includes an on-off valve 66 and a hydraulic accumulator 68, the on-off valve 66 optionally connecting the hydraulic lines 52, 54 to the hydraulic tank 56 and/or to the hydraulic accumulator 68. The on-off valve 66 is configured as a 4/3-way valve. In a central position 70 of the on-off valve 66 the hydraulic lines 52, 54 are both connected to the hydraulic tank 56 in a so-called floating position. Two further actuated positions 72, 74 of the on-off valve 66 connect the hydraulic lines 52, 54 to the hydraulic tank 56 or to the hydraulic accumulator 68, in the actuated position 72 the hydraulic line 52 being connected to the hydraulic tank 56 and the hydraulic line 54 to the hydraulic accumulator 68, and in the actuated position 74 the hydraulic line 54 being connected to the hydraulic tank 56 and the hydraulic line 52 to the hydraulic accumulator 68. The on-off valve 66 is preferably electromagnetically actuated via magnetic coils 76, a corresponding control signal being able to be generated by a sensor 78 positioned on the central frame 18 in combination with an electronic control unit 80. Moreover, the on-off valve 66 is provided with restoring springs 82, which when the control signal is not present for the magnetic coils 76 hold and/or return the on-off valve 66 in the central position 70. The sensor 78 is configured and arranged such that a pivoting of the central frame 18 relative to the support 16 beyond a preadjustable limit pivoting angle or limit angle of oscillation triggers a sensor signal, a limit pivoting angle and/or limit angle of oscillation being defined about the vertical oscillating axis 32 in both pivoting directions. The sensor 78 generates a first sensor signal when reaching or exceeding the limit pivoting angle in a first pivoting direction and a second sensor signal when reaching or exceeding the limit pivoting angle in the opposing pivoting direction, the two sensor signals triggering control signals which are different from one another for activating the control valve 66 by the electronic control unit 80, i.e. respectively an activation of one of the magnetic coils 76 is associated with the different sensor signals so that the control signal is actuated into the switched position 72 with the one sensor signal and is actuated into the actuated position 74 with the other control signal. The arrangement of the sensor 78 is shown in FIG. 1, the sensor comprising a metal projection 82 fastened to the support 16, which moves relative to two magnetic coils 86, 88 mounted via a coil holder 84 on the central frame 18, as soon as the central frame 18 is pivoted. As soon as the central frame 18 carries out oscillating movements, which reach the limit pivoting angle preset by corresponding positioning of the magnetic coils 86, 88, for example a pivoting angle deviating +/−2° from a basic position of the central frame 18 parallel to the support 16, the metal projection 82 passes through one of the magnetic coils 86, 88, whereby a corresponding control signal for the on-off valve 66 is generated. By the corresponding activation of the control valve 66, the hydraulic accumulator 68 is connected to the hydraulic cylinders 34, 36, whereby the hydraulic pressure may respectively be increased in one of the hydraulic chambers 44, 46, 48, 50 of the hydraulic cylinder 34, 36 connected via the hydraulic lines 52, 54. With an increase in the hydraulic pressure by the hydraulic accumulator 68, an additional restoring force may be generated for the central frame 18, if the central frame 18 has exceeded and/or reached the preset limit pivoting angle and/or limit angle of oscillation. A corresponding initial hydraulic loading of the hydraulic accumulator 68 takes place via a hydraulic pump 90 which is connected via a non-return valve 92 to the hydraulic accumulator 68 and draws hydraulic fluid from the hydraulic tank 56 via a hydraulic line 94. When exceeding and/or reaching the preset limit pivoting angle and/or limit angle of oscillation, by a specific connection thereto of the hydraulic accumulator 68 during a pivoting movement and/or oscillating movement of the central frame 18 an additional pressure loading of the hydraulic accumulator 68 is achieved, whereby in addition to the damping generated by the one-way restrictors 58, 60, 62, 64, an additional damping of the pivoting movement and/or of the oscillating movement occurs. The energy stored by the additional pressure loading in the hydraulic accumulator 68, is then discharged again by a corresponding specific connection thereto of the hydraulic accumulator 68, whereby finally the additional restoring force for the central frame 18 is generated. In order to be able to control the pressure ratios in the hydraulic arrangement of the embodiment shown in FIG. 5 in a specific manner, an adjustable pressure control valve 96 and a first and second adjustable pressure relief valve 98, 100 or sequence valve are provided. The pressure control valve 96 is connected between the hydraulic accumulator 68 and the on-off valve 66. The pressure control valve 96 closes when pressure exceeds an adjustable limit pressure and/or controls a hydraulic flow from the hydraulic accumulator 68 in the direction of the hydraulic cylinders 34, 36, such that the set limit pressure is not exceeded. The limit pressure set on the pressure control valve 96 thus corresponds to a preadjustable return pressure, at which the above disclosed additional restoring force may be generated. The first adjustable pressure relief valve 98 is arranged parallel to the pressure control valve 96 between the on-off valve 66 and the hydraulic accumulator 68. The first pressure relief valve 98 allows a hydraulic flow between the on-off valve 66 and the hydraulic accumulator 68, as soon as an adjustable limit pressure is reached, and/or interrupts said hydraulic flow as soon as the set limit pressure is fallen below. The limit pressure set on the first pressure relief valve 98 corresponds, therefore, to a preadjustable damping pressure by which the above disclosed additional damping of the pivoting movement and/or the oscillating movement may be achieved. The second pressure relief valve 100 is arranged between the hydraulic accumulator 68 and the hydraulic tank 56. The second pressure relief valve 100 allows a hydraulic flow between the hydraulic accumulator 68 and the hydraulic tank 56 and/or between the first pressure relief valve 98 and the hydraulic accumulator 56, as soon as an adjustable limit pressure is reached, and/or interrupts said hydraulic flow, as soon as the set limit pressure is fallen below. The limit pressure set on the second pressure relief valve 100 thus corresponds to a preadjustable maximum operating pressure, at which the hydraulic arrangement shown in FIG. 5 may be operated.

The mechanical-hydraulic relations of the hydraulic arrangement shown in FIG. 5 are explained hereinafter with reference to an oscillating movement which causes a retraction of the left hydraulic cylinder 34 of FIG. 5. The explanations of the embodiment shown in FIG. 4 are also applicable here, and therefore details are provided only of the effects and mechanical-hydraulic relations of the additional components shown in FIG. 5. The expanded embodiment shown in FIG. 5 takes account of damping and restoring force during oscillating movements of the central frame 18 relative to the support 16 which extends beyond the damping and restoring force shown in the embodiment in FIG. 4, and/or designs this to be variable. In this regard, exceeding a preadjustable limit pivoting angle and/or limit angle of oscillation which is set by a corresponding arrangement of the magnetic coils 86, 88 and the metal projection 82 to, for example, +/−2° is taken as a basis. With a pivoting movement of the central frame 18 below the limit pivoting angle of, for example, +/−2° the on-off valve 66 is located in its central position 70, in which both hydraulic lines 52, 54 are connected in the floating position to one another and to the hydraulic tank 56. For this operating mode, the same effects and mechanical-hydraulic relations apply as already disclosed above in the embodiment shown in FIG. 4. When reaching the limit pivoting angle and/or limit angle of oscillation or with a pivoting movement of the central frame 18 beyond the limit pivoting angle, in which for example a retraction of the left hydraulic cylinder 34 from FIG. 5 takes place, a sensor signal is generated by the sensor 78 and/or by the magnetic coils 86 which causes a generation of a actuating signal for actuating the on-off valve 66 into the actuated position 72 by the electronic control unit 80. The on-off valve 66 connects the hydraulic line 54 to the first pressure relief valve 98. By the pivoting motion of the central frame 18 the hydraulic pressure increases in the hydraulic line 54, until the set damping pressure is reached and the pressure relief valve 98 opens. The hydraulic fluid flowing out of the hydraulic chambers 46, 48 is braked by the increasing hydraulic pressure, whereby an additional throttling of the hydraulic fluid out of the hydraulic chambers 46, 48 is achieved. As soon as the pressure relief valve 98 opens a hydraulic flow takes place into the hydraulic accumulator 68, which leads to a pressure loading of the hydraulic accumulator 68. At the same time as the outflow of the hydraulic fluid from the hydraulic chambers 46, 48, hydraulic fluid is sucked into the hydraulic chambers 44, 50 via the hydraulic line 52 connected to the hydraulic tank. As the hydraulic chambers 44, 46 are substantially unpressurized and the forces acting on the central frame 18 reduce and/or the motion energy reduces on the central frame 18, from a specific existing state the central frame 18 begins to move again in the opposing direction and the hydraulic pressure begins to drop in the hydraulic line 54, until initially falling below the damping pressure and the pressure relief valve 98 closes. A further pressure drop follows until the return pressure set on the pressure control valve 96 is reached. As soon as the pressure control valve 96 opens, the energy stored in the hydraulic accumulator 68 in the form of excess pressure is released and converted into motion energy, whereby a restoring force is created and the hydraulic fluid flowing back into the hydraulic chambers 46, 48 flows back at increased pressure, i.e. accelerated. As a result, a return into a pivoted position with a pivoting angle and/or angle of oscillation in the range of between +/−2° is achieved which is as rapid as possible. As soon as the pivoting angle and/or angle of oscillation is below the limit pivoting angle and/or limit oscillation angle, a corresponding signal is generated, produced by the sensor 78 and/or by the magnetic coils 86, which is recognized as such by the electronic control unit and is converted into a corresponding actuating signal for the on-off valve 66, whereupon the on-off valve again is actuated into the central position 70 and the mechanical-hydraulic relations already described above in FIG. 4 again prevail.

A corresponding effect with similar mechanical-hydraulic relations as disclosed above occurs when the central frame 18 is pivoted in the other direction and the limit pivoting angle and/or limit angle of oscillation is reached or exceeded, then the hydraulic cylinder 36 is retracted and the hydraulic cylinder 34 is extended. With these movement sequences a signal is triggered by the sensor 78 and/or by the magnetic coils 88 for actuating the on-off valve 66, whereupon by the electronic control a corresponding control signal is generated for actuating the on-off valve 66 into the actuated position 74. Accordingly, the hydraulic line 54 is then connected to the hydraulic accumulator 68 and/or to the pressure relief valve 98 and/or to the pressure control valve 96 and the hydraulic line 52 to the hydraulic tank 56. The resulting effects relative to the additional damping and restoring force occur in a correspondingly similar manner as described above until the central frame 18 has again adopted a position or location within the predetermined limit pivoting angle and/or limit angle of oscillation.

If when reaching or exceeding the limit pivoting angle and/or limit oscillation angle due to high forces, which act on the central frame 18, the operating limit pressure set on the pressure relief valve 100 is reached, then said pressure relief valve opens so that hydraulic fluid may flow out into the hydraulic tank 56, until the operating pressure has dropped again below the operating limit pressure. The pressure relief valve 100 thus essentially represents a safety valve.

The limit pivoting angle and/or limit angle of oscillation of +/−2° cited in the above described embodiment in FIG. 5, is only selected at this value by way of example. Larger or smaller limit pivoting angles and/or limit angles of oscillation may also be set, nothing being altered in principle as regards the effects and mechanical-hydraulic relations of the hydraulic arrangement of FIG. 5.

While the invention has been described merely with reference to two embodiments, the person skilled in the art may deduce, in view of the above description as well as the drawings, many different types of alternatives, modifications and variants, which lie within the scope of the present invention. Thus, for example, instead of the non-return valve 92 a pressure relief valve may be provided which controls the hydraulic flow from the hydraulic pump 90 into the hydraulic accumulator 68. Also it is conceivable to dispense with a hydraulic pump 90, the hydraulic arrangement having to be monitored for possible leakages during regular maintenance and possibly refilled with hydraulic fluid. Moreover, it may be advantageous to provide between the pressure control valve 96 and the on-off valve 66 and/or the pressure relief valve 98 a non-return valve, closing in the direction of the hydraulic accumulator 68.

Having described the preferred embodiment, it will become apparent that various modifications can be made without departing from the scope of the invention as defined in the accompanying claims.

The invention claimed is:

1. A spray linkage for a crop sprayer, comprising a support and a central frame pivotally connected to the support, the central frame being pivotable relative to the support from a neutral position about an upright oscillating axis, and first and second hydraulic cylinders each pivotally connected at one end to the support and at another end to the central frame, the first and second hydraulic cylinders extending or retracting when the central frame pivots relative to the support from the neutral position, characterized in that the first hydraulic cylinder has a first and a second hydraulic chamber, the second hydraulic cylinder has a first and second hydraulic chamber, a first hydraulic line hydraulically connected to the first hydraulic chamber of the first hydraulic cylinder and to the second hydraulic chamber of the second hydraulic cylinder, a second hydraulic line connected to the second hydraulic chamber of the first hydraulic cylinder and to the first hydraulic chamber of the second hydraulic cylinder, means for throttling a hydraulic flow exiting from one of the hydraulic chambers providing substantially unthrottled hydraulic flow entering into one of the hydraulic chambers.

2. The spray linkage as claimed in claim 1, wherein the second hydraulic cylinder and the first hydraulic cylinder are located on opposite sides of the upright oscillating axis, the first hydraulic cylinder extending or retracting and the second hydraulic cylinder retracting and/or extending as the central frame pivots from the neutral position relative to the support.

3. The spray linkage as claimed in claim 1, wherein the means for throttling comprise a one-way restrictor.

4. The spray linkage as claimed in claim 1, including a hydraulic tank connected to both hydraulic lines.

5. The spray linkage as claimed in claim 4, including an on-off valve connecting the first and/or the second hydraulic line to the hydraulic tank, the on-off valve comprising a 4/3-way valve with a floating central position and the on-off valve actuatable depending on a pivoted position of the central frame relative to the support.

6. The spray linkage as claimed in claim 5, wherein a hydraulic accumulator is connected via the on-off valve to the first or to the second hydraulic line.

7. The spray linkage as claimed in claim 1, including a sensor which signals at least one pivoted position of the central frame (18) relative to the support.

8. The spray linkage as claimed in claim 6, wherein a pressure control valve is arranged between the hydraulic accumulator and the on-off valve.

9. The spray linkage as claimed in claim 8, wherein a first pressure relief valve is arranged between the hydraulic accumulator and the on-off valve, the pressure relief valve being arranged parallel to the pressure control valve.

10. The spray linkage as claimed in claim 9, wherein a second pressure relief valve is arranged between the hydraulic accumulator and the hydraulic tank.

11. The spray linkage as claimed in claim 1, including resilient stop structure located on opposite sides of the oscillating axis.

12. The spray linkage as claimed in claim 1, including an oscillating frame, wherein the support is pivotally suspended from the oscillating frame for pivoting about a first generally horizontal oscillating axis.

13. The spray linkage as claimed in claim 12, including a mounting frame to which the oscillating frame is fastened, the oscillating frame being pivotally suspended on the mounting frame for pivoting about a second generally horizontal oscillating axis.

14. The spray linkage as claimed in claim 13, wherein the mounting frame is connected to a crop sprayer.

15. The spray linkage as claimed in claim 13, wherein the mounting frame is connected in a height-adjustable manner to a crop sprayer.

16. A spray linkage for a crop sprayer, comprising a support and a central frame pivotally connected to the support, the central frame being pivotable relative to the support from a neutral position about an upright oscillating axis, and first and second hydraulic cylinders each pivotally connected at one end to the support and at another end to the central frame, the first and second hydraulic cylinders extending or retracting when the central frame pivots relative to the support from the neutral position, characterized in that the first hydraulic cylinder has a first and a second hydraulic chamber, the second hydraulic cylinder has a first and second hydraulic chamber, a first hydraulic line hydraulically connected to the first hydraulic chamber of the first hydraulic cylinder and to the second hydraulic chamber of the second hydraulic cylinder a second hydraulic line connected to the second hydraulic chamber of the first hydraulic cylinder and to the first hydraulic chamber of the second hydraulic cylinder, one-way valve structure connected between the first and second hydraulic cylinders and throttling a hydraulic flow exiting from one of the hydraulic chambers and providing substantially unthrottled hydraulic flow entering into one of the hydraulic chambers.

17. The spray linkage as claimed in claim 16, wherein the second hydraulic cylinder and the first hydraulic cylinder are located on opposite sides of the upright oscillating axis, the first hydraulic cylinder extending or retracting and the second hydraulic cylinder retracting and/or extending as the central frame pivots from the neutral position relative to the support.

18. The spray linkage as claimed in claim 16, wherein the one-way valve structure includes a throttle valve and a bypass line provided with a non-return valve to dampen oscillating movement and/or pivoting movement of the central frame.

19. The spray linkage as claimed in claim 16, further including a hydraulic tank, an on-off valve and a hydraulic accumulator, the on-off valve connecting the first and second hydraulic lines to the hydraulic tank and/or to the hydraulic accumulator.

* * * * *